United States Patent
Li et al.

(10) Patent No.: US 10,194,086 B2
(45) Date of Patent: Jan. 29, 2019

(54) IMAGE PROCESSING METHOD AND IMAGING DEVICE

(71) Applicant: NUBIA TECHNOLOGY CO., LTD., Shenzhen, Guangdong (CN)

(72) Inventors: Qiang Li, Shenzhen (CN); Qiang Wei, Shenzhen (CN); Lei Miao, Shenzhen (CN); Kai Wang, Shenzhen (CN); Hongliang Jing, Shenzhen (CN)

(73) Assignee: Nubia Technology Co., LTD. (CN)

( * ) Notice: Subject to any disclaimer, the term of this patent is extended or adjusted under 35 U.S.C. 154(b) by 22 days.

(21) Appl. No.: 15/247,595

(22) Filed: Aug. 25, 2016

(65) Prior Publication Data

US 2016/0366341 A1 Dec. 15, 2016

Related U.S. Application Data

(63) Continuation of application No. PCT/CN2014/085629, filed on Aug. 30, 2014.

(30) Foreign Application Priority Data

Feb. 27, 2014 (CN) .......................... 2014 1 0069624

(51) Int. Cl.
*H04N 5/232* (2006.01)
*H04N 5/235* (2006.01)

(52) U.S. Cl.
CPC ......... *H04N 5/23293* (2013.01); *H04N 5/232* (2013.01); *H04N 5/2356* (2013.01)

(58) Field of Classification Search
CPC ... H04N 5/232; H04N 5/23293; H04N 5/2356
See application file for complete search history.

(56) References Cited

U.S. PATENT DOCUMENTS

| 8,823,854 B2 | 9/2014 | Yoshida |
| 2008/0186387 A1* | 8/2008 | Iwamoto .............. H04N 5/2353 348/222.1 |

(Continued)

FOREIGN PATENT DOCUMENTS

| CN | 1591155 A | 3/2005 |
| CN | 1805505 A | 7/2006 |

(Continued)

OTHER PUBLICATIONS

International Search Report dated Dec. 5, 2014 in International Application No. PCT/CN2014/085629, 2 pages.

(Continued)

*Primary Examiner* — Abdelaaziz Tissire
(74) *Attorney, Agent, or Firm* — Eric L. Sophir; Dentons US LLP (57) ABSTRACT

An image processing method and an imaging device thereof are disclosed in the present invention. The image processing method includes the steps of: in the process of imaging, continuously collecting image data to a cache module, and adjusting the collecting speed according to the remaining space of the cache module; generating images continuously according to the image data; and displaying the images on a display. Thus, the processing capacity of the imaging device is utilized to the maximum limit, and the data loss due to an excessive fast collection speed is prevented. Meanwhile, the real-time performance of displaying the exposure effect is improved, and the user experience is also improved. After the exposure, the user is allowed to choose several photographs with different exposure effects from the display, thus the user may obtain several photographs with various photographing effects by photographing one time, and the user experience is further improved.

16 Claims, 3 Drawing Sheets

(56) References Cited

U.S. PATENT DOCUMENTS

| | | | |
|---|---|---|---|
| 2008/0316331 A1* | 12/2008 | Jun | H04N 1/0044 348/222.1 |
| 2009/0135295 A1* | 5/2009 | Kunishige | H04N 5/23232 348/362 |
| 2010/0208094 A1* | 8/2010 | Iijima | H04N 5/2353 348/222.1 |
| 2011/0001838 A1* | 1/2011 | Lee | H04N 5/225 348/220.1 |
| 2011/0109778 A1 | 5/2011 | Yoshida | |
| 2012/0172086 A1* | 7/2012 | Choi | H04N 1/0044 455/556.1 |
| 2012/0257071 A1* | 10/2012 | Prentice | H04N 5/23238 348/220.1 |
| 2013/0021504 A1* | 1/2013 | Plowman | H04N 19/56 348/241 |
| 2013/0258136 A1* | 10/2013 | Lee | H04N 5/772 348/231.99 |
| 2015/0237280 A1* | 8/2015 | Choi | H04N 5/23293 348/308 |
| 2016/0373646 A1* | 12/2016 | Fredlund | H04N 1/00488 |

FOREIGN PATENT DOCUMENTS

| | | |
|---|---|---|
| CN | 101442611 A | 5/2009 |
| CN | 101478643 A | 7/2009 |
| CN | 101860674 A | 10/2010 |
| CN | 102377873 A | 3/2012 |
| CN | 103095984 A | 5/2013 |
| CN | 103384310 A | 11/2013 |
| CN | 103561339 A | 2/2014 |
| CN | 103841328 A | 6/2014 |
| JP | H06165099 A | 6/1994 |
| JP | 2005117395 A | 4/2005 |
| JP | 2005354166 A | 12/2005 |
| JP | 2006093984 A | 4/2006 |
| JP | 2007116265 A | 5/2007 |
| JP | 2009130471 A | 6/2009 |
| JP | 2010074205 A | 4/2010 |
| KR | 20130055444 A | 5/2013 |

OTHER PUBLICATIONS

English Translation of the Written Opinion of the International Searching Authority dated Dec. 5, 2014 in International Application No. PCT/CN2014/085629, 7 pages.

Korean Communication dated Apr. 12, 2017 in Korean Application No. KR2016-7026110, 5 pages.

Chinese Communication (with a concise English explanation) dated Nov. 23, 2018, in corresponding Chinese Application No. 201480073264.8, 6 pages.

* cited by examiner

IMAGE PROCESSING METHOD AND IMAGING DEVICE

CROSS-REFERENCE

This application is a continuation application of International patent application No. PCT/CN2014/085629, filed on Aug. 30, 2014, which claims priority to Chinese Patent Application No. 201410069624.9, filed with the Chinese Patent Office on Feb. 27, 2014, both of which are herein incorporated by reference in its entirety.

TECHNICAL FIELD

The disclosure relates to the field of photography, and in particular to an image processing method and imaging device.

BACKGROUND

In an imaging device, a shutter speed represents a period of time a shutter stays open when the camera takes a photo. The shutter speed may decide, together with a size of a lens aperture (also known as an F-number), an amount of light reaching a film or a sensor, also known as exposure. The faster the shutter speed, the shorter an exposure time, and the less the exposure. However in this case, a moving object may leave a clearer image on the film. The slower the shutter speed, the longer the exposure time, and the more the exposure. However in this case, the image of the moving object on the film will appear fuzzy. In general, imaging with a shutter speed of 1/30 second or less may be called imaging with a slow shutter speed. Using imaging with a slow shutter speed, a photo with a special effect or an artistic effect may be obtained.

In related art, during imaging with a slow shutter speed, an imaging device may collect image data at regular intervals, and continuously generate images using the image data, thereby displaying an exposure effect in real time. However, in related art image data are collected continuously at fixed intervals, instead of at intervals variable as needed. Different imaging devices may process data at different speeds. An imaging device may process data at different speeds under different circumstances. When an overly large interval is set, the exposure effect will not be displayed in real time, impacting user experience. When an overly short interval is set, image data collected in time may go beyond computing capacity of an imaging device, leading to data loss.

SUMMARY

Embodiments herein provide an image processing method and imaging device, capable of making maximal use of processing capacity of an imaging device, improving a real-time nature in displaying the exposure effect, improving user experience.

An image processing method herein may include:

continuously collecting image data, and outputting the image data every set time;

after outputting the image data, generating a new image, according to synthesize the image data and an image at the previous moment by adding image data that have been collected after commencement of the image data collection, and displaying the new image on a display;

showing all generated images on the display for a user to choose from; and storing, in an image storing module, an image on the display chosen by the user.

The adjusting a collecting speed according to space remaining in the caching module may include:

determining whether the space remaining in the caching module reaches a preset value;

when the space remaining in the caching module reaches the preset value, adjusting the collecting speed to a preset speed.

The displaying the images on a display may include:

displaying the images one by one on the display, overlaying an image generated earlier with an image generated later.

The method may further include: after the displaying the images on a display, after the imaging ends, displaying all generated images on the display;

storing, in an image storing module, an image on the display chosen by a user.

The method may further include: after the displaying the images on a display, after the imaging ends, storing, in an image storing module, an image being displayed on the display.

The continuously generating images according to the image data may include continuously generating preview-sized images and full-sized images respectively according to the image data. The displaying the images on a display may include displaying the preview-sized images on the display.

The displaying the images on a display may include:

displaying the preview-sized images one by one on the display, overlaying a preview-sized image generated earlier with a preview-sized image generated later.

The method may further include: after the displaying the images on a display, after the imaging ends, displaying all generated preview-sized images on the display;

storing, in an image storing module, a full-sized image corresponding to a preview-sized image on the display chosen by a user.

The method may further include: after the displaying the images on a display, after the imaging ends, storing, in an image storing module, a full-sized image corresponding to a preview-sized image being displayed on the display.

An imaging device as provided herein includes a controlling module, an imaging module, a caching module, a generating module, a temporary storage module, and a displaying module.

The controlling module is configured for integrated control of operation of the modules.

The imaging module is configured for: during imaging, continuously collecting image data into the caching module, and adjusting a collecting speed according to space remaining in the caching module.

The caching module is configured for caching the image data.

The generating module is configured for continuously generating images according to the image data.

The temporary storage module is configured for temporarily storing the continuously generated images.

The displaying module is configured for displaying the images on a display.

The imaging module may be further configured for:

determining whether the space remaining in the caching module reaches a preset value;

when the space remaining in the caching module reaches the preset value, adjusting the collecting speed to a preset speed.

The temporary storage module may include a first temporary storage unit and a second temporary storage unit.

The displaying module may be configured for displaying the images one by one on the display, overlaying an image generated earlier with an image generated later.

The device may further include an image storing module. The displaying module may be further configured for: after the imaging ends, displaying all generated images on the display. The controlling module may be further configured for storing, in the image storing module, an image on the display chosen by a user.

The controlling module may be further configured for: after the imaging ends, storing, in the image storing module, an image being displayed on the display.

The generating module may be configured for: continuously generating preview-sized images and full-sized images respectively according to the collected image data; storing the preview-sized images in the first temporary storage unit; and storing the full-sized images in the second temporary storage unit.

The controlling module may be configured for outputting the preview-sized images in the first temporary storage unit to the displaying module to display the preview-sized images.

The displaying module may be configured for displaying the preview-sized images one by one on the display, overlaying a preview-sized image generated earlier with a preview-sized image generated later.

The displaying module may be further configured for: after the imaging ends, displaying all generated preview-sized images on the display. The controlling module may be further configured for storing, in the image storing module, a full-sized image corresponding to a preview-sized image on the display chosen by a user.

The controlling module may be further configured for: after the imaging ends, storing, in the image storing module, a full-sized image corresponding to a preview-sized image being displayed on the display.

With an image processing method as provided herein, image data may be collected continuously during the entire imaging process, images may be generated continuously using the collected image data, and the generated images may be displayed on a display in real time, such that the user may preview the exposure effect. During the image data collection, a collecting speed is adjusted in real time according to space remaining in a caching module, making maximal use of processing capacity of an imaging device while avoiding data loss caused by an overly large collecting speed, improving a real-time nature in displaying the exposure effect, improving user experience. After the exposure ends, the user is allowed to choose multiple photos with different exposure effects from the display, such that the user may obtain, with one photographing operation, multiple photos with various effects, further improving user experience.

Implementation, features, and advantages of the present disclosure will be described further with reference to embodiments and drawings.

DETAILED DESCRIPTION

Note that an embodiment illustrated here is merely for explaining the present disclosure, and is not intended to limit the present disclosure.

According to an embodiment herein, image data may be continuously collected, and after a period of time, image data collected in the period of time may be output every set time, either fixed time or unfixed time depending on the image processing speed of imaging device can be used for the set time; an image of a present moment may be synthesized according to image data output at the present moment and an image synthesized at the previous moment, and the image of the present moment may be displayed on a display; all synthesized images may be displayed on the display for a user to choose from; and an image on the display chosen by the user may be stored in an image storing module.

Figure 1:
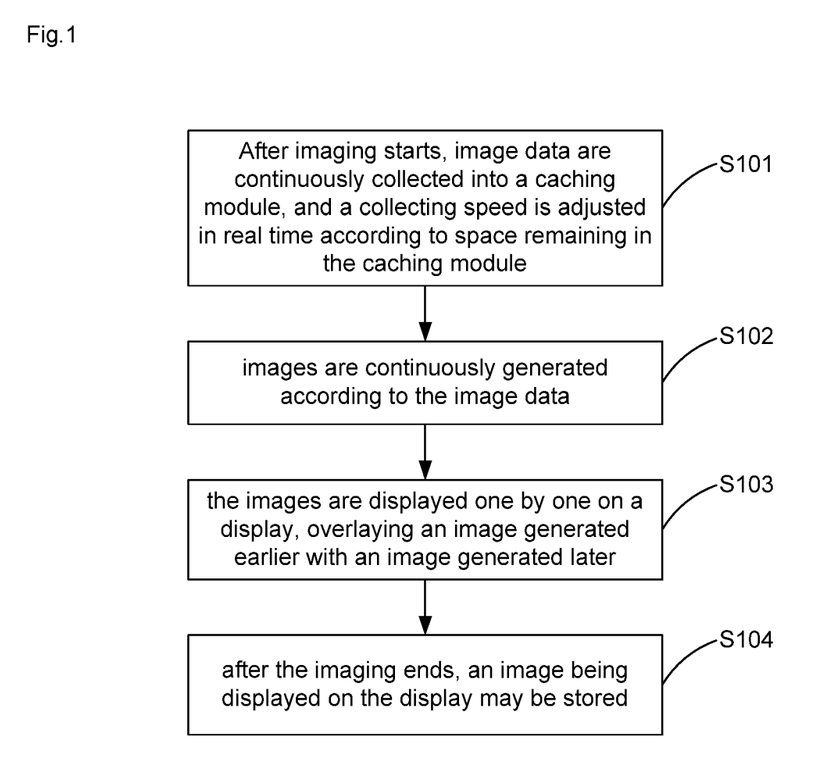
FIG. 1 is a flowchart of an image processing method according to a first embodiment herein.

Referring to FIG. 1, an image processing method according to a first embodiment herein includes steps as follows.

In step S101, after imaging starts, image data are continuously collected into a caching module, and a collecting speed is adjusted in real time according to space remaining in the caching module.

After a user presses a shutter button or triggers a virtual shutter button, an imaging device may start imaging, continuously collecting image data into a caching module. During the image data collection, it may be determined in real time whether the space remaining in the caching module reaches a preset value. When the space remaining in the caching module reaches the preset value, the collecting speed may be adjusted to a preset speed.

For example, in response to detecting space remaining in the caching module of 50% or more, the imaging device may collect image data at a maximal collecting speed. In response to detecting space remaining in the caching module less than 50%, the imaging device may lower the present collecting speed by half. In response to detecting space remaining in the caching module restored back to 50% or more, the imaging device may again restore the maximal collecting speed. There may be multiple preset values and preset speeds, progressively increasing or decreasing, as needed. Thus, it is possible to make maximal use of the processing capacity of the imaging device, while avoiding data overflow and data loss caused by an overly large collecting speed.

In step S102, images are continuously generated according to the image data.

The imaging device may generate images by performing a series of operations on the collected image data, and temporarily store the generated images. The imaging device may synthesize a new image by performing an adding operation on image data presently received and image data received previously, and perform noise reduction on the generated image. Meanwhile, a synthesizing ratio for synthesizing a recently collected image may be controlled according to exposure of an existing image to suppress overexposure. Assume that RGB or YUV information of a first image is RGB1 or YUV1. As YUV and RGB may be converted to each other, YUV is adopted hereinafter for illustrative purpose. Then, YUV information of an nth image may be $YUVn=(1/m)*(YUV1+\ldots+YUVn-1)$. The m is an aperture parameter. Even though the images are generated continuously, given a limited computing-processing speed of the imaging device, two images next to each other are actually generated with a time interval. The faster the computing speed, the shorter the time interval will be. The speed at which the images are generated may in turn impact the image data collecting speed in step S101. The faster the image generating speed, the faster the image data in the caching module may be read, the faster the space in the caching module may be vacated, and thereby the imaging device may collect the image data at a greater speed.

The imaging device may continuously generate preview-sized images and full-sized images respectively according to the collected image data, and output and display the preview-sized images in real time on the display. A preview-sized image may refer to an image of a small number of pixels. A full-sized image may refer to an image of a large number of pixels required or set by the user, much larger than the number of pixels in a preview-sized image. An image of a large number of pixels is generated at a slow speed. With an imaging device of a slow computing speed, slow image generation will lead to intermittent image display in real time. The preview-sized images and the full-sized images may be generated respectively through two threads. The preview-sized images, each having a small number of pixels, may be generated faster, and thereby will be output and displayed on the display in real time more smoothly, avoiding intermittent display.

In step S103, the images are displayed one by one on a display, overlaying an image generated earlier with an image generated later.

As soon as the user presses the shutter, a first generated image P1 may be displayed on the display, and after a period of time be overlaid with a second image P2, which per se may then be displayed on the display . . . , and an image Pn-1 may be overlaid with an nth image Pn, which per se may then be displayed on the display. In this way, exposure effects at different exposure times may be displayed in real time during the imaging.

In step S104, after the imaging ends, an image being displayed on the display may be stored.

A shutter for imaging with a slow shutter speed may include a shutter B, a shutter T, etc. A shutter B stays open during a period from when the shutter is pressed to when the shutter is released. A shutter T stays open during a period from when the shutter is pressed to when the shutter is pressed again. When observing that an image with a satisfying exposure effect is being displayed on the display, the user may release the shutter B or press the shutter T again to end the imaging, thereby ending the entire exposure process. The imaging device may then store the image being displayed on the display. Thereby, the user may obtain a fairly good photo simply by one photographing operation.

In case the preview-sized images and the full-sized images are generated respectively, a full-sized image generated last may be stored.

Figure 2:
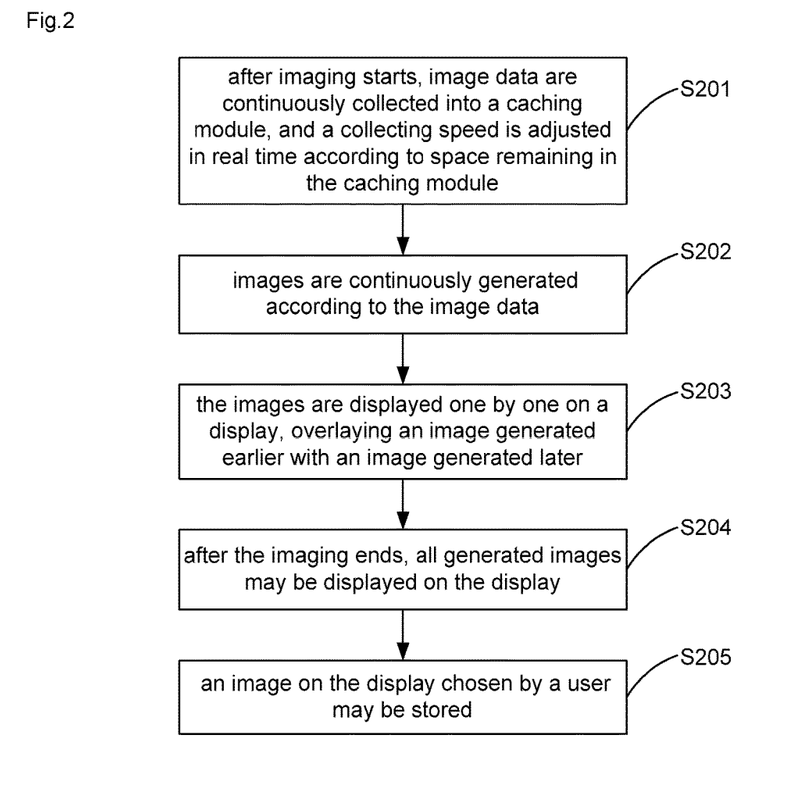
FIG. 2 is a flowchart of an image processing method according to a second embodiment herein.

Referring to FIG. 2, an image processing method according to a second embodiment herein may include steps as follows.

In step S201, after imaging starts, image data are continuously collected into a caching module, and a collecting speed is adjusted in real time according to space remaining in the caching module.

In step S202, images are continuously generated according to the image data.

In step S203, the images are displayed one by one on a display, overlaying an image generated earlier with an image generated later.

Steps S201~S203 in the embodiment are identical to steps S101~S103 in the first embodiment, with step S201 corresponding to step S101, step S202 corresponding to step S102, step S203 corresponding to step S103, and thus are not repeated here.

In step S204, after the imaging ends, all generated images may be displayed on the display.

The user may release a shutter B or press a shutter T again to end the entire imaging process. The imaging device may tile the display with all generated images such that they are displayed. In this way, during imaging, photos with exposure effects at different exposure times may be displayed in real time, and images with different exposure effects may be displayed at the same time, such that the user may compare, and choose from, the displayed images.

In S205, an image on the display chosen by a user may be stored.

The user may view the generated images on the display, and choose therefrom one or more favorite images. The imaging device may store the image(s) chosen by the user. In this way, the user may obtain multiple photos with various effects merely with one photographing operation.

Accordingly, with an image processing method herein, image data are collected continuously in the entire imaging process; images are continuously generated in real time using the collected image data and are displayed on the display, such that the user may preview the exposure effect. During the image data collection, the collecting speed is adjusted in real time according to the space remaining in the caching module, making maximal use of processing capacity of an imaging device while avoiding data loss caused by an overly large collecting speed, improving a real-time nature in displaying the exposure effect, improving user experience. After the exposure ends, the user is allowed to choose multiple photos with different exposure effects from the display, such that the user may obtain, with one photographing operation, multiple photos with various effects, further improving user experience.

Figure 3:
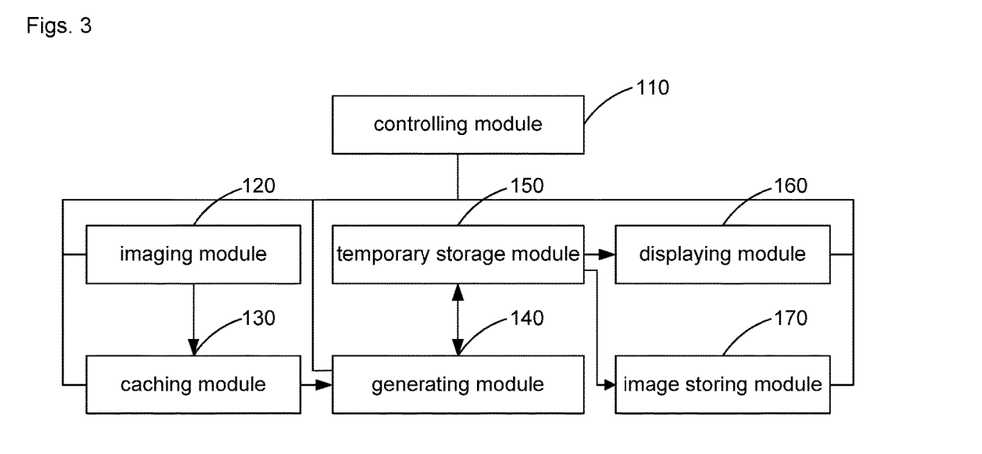
FIG. 3 is a diagram of modules of an imaging device according to a first embodiment herein.

Referring to FIG. 3, an imaging device according to a first embodiment herein may be a camera, or terminal equipment such as a mobile phone, a tablet, etc., with a camera function. The imaging device implements an aforementioned image processing method. The imaging device may include a controlling module 110, an imaging module 120, a caching module 130, a generating module 140, a temporary storage module 150, a displaying module 160, and an image storing module 170.

The controlling module 110 may be configured for integrated control of operation of the modules, thereby controlling the entire flow.

The imaging module 120 may be configured for: during imaging, continuously collecting image data into the caching module, and adjusting a collecting speed according to space remaining in the caching module.

After a user presses a shutter button or triggers a virtual shutter button, the imaging module 120 may start imaging, continuously collecting image data into a caching module. During the image data collection, it may be determined in real time whether the space remaining in the caching module reaches a preset value. When the space remaining in the caching module reaches the preset value, the collecting speed may be adjusted to a preset speed.

For example, in response to detecting space remaining in the caching module 130 of 50% or more, the imaging module 120 may collect image data at a maximal collecting speed. In response to detecting space remaining in the caching module 130 less than 50%, the imaging module may lower the present collecting speed by half. In response to detecting space remaining in the caching module 130 restored back to 50% or more, the imaging module may again restore the maximal collecting speed. There may be multiple preset values and preset speeds, progressively increasing or decreasing, as needed. Thus, it is possible to make maximal use of the processing capacity of the imaging device, while avoiding data overflow and data loss caused by an overly large collecting speed.

The generating module 140 may be configured for continuously generating images according to the image data.

The generating module 140 may read the image data in the caching module 130, generate images by performing a series of operations on the collected image data, and store the generated images in the temporary storage module. The generating module 140 may synthesize a new image by performing an adding operation on image data presently received and image data received previously, and perform noise reduction on the generated image. Meanwhile, a synthesizing ratio for synthesizing a recently collected image may be controlled according to exposure of an existing image to suppress overexposure. Assume that RGB or YUV information of a first image is RGB1 or YUV1. As YUV and RGB may be converted to each other, YUV is adopted hereinafter for illustrative purpose. Then, YUV information of an nth image may be YUVn=(1/m)* (YUV1+ . . . +YUV n-1). The m is an aperture parameter.

Even though the images are generated continuously, given a limited computing-processing speed of the generating module 140, two images next to each other are actually generated with a time interval. The faster the computing speed, the shorter the time interval will be. Meanwhile, the speed at which the generating module 140 generates the images may in turn impact the speed at which the imaging module 120 collects the image data. The faster the image generating speed, the faster the image data in the caching module 130 may be read, the faster the space in the caching module may be vacated, and thereby the imaging module 120 may collect the image data at a greater speed.

The displaying module 160 may be configured for displaying the continuously generated images in real time on the display.

The controlling module 110 may output the images in the temporary storage module 150 to the displaying module 160 in real time. The displaying module 160 may display the images one by one on the display, overlaying an image generated earlier with an image generated later. As soon as the user presses the shutter, a first generated image P1 may be displayed on the display, and after a period of time be overlaid with a second image P2, which per se may then be displayed on the display . . . , and an image Pn-1 may be overlaid with an nth image Pn, which per se may then be displayed on the display. In this way, exposure effects at different exposure times may be displayed in real time during the imaging.

A shutter for imaging with a slow shutter speed may include a shutter B, a shutter T, etc. A shutter B stays open during a period from when the shutter is pressed to when the shutter is released. A shutter T stays open during a period from when the shutter is pressed to when the shutter is pressed again. When observing that an image with a satisfying exposure effect is being displayed on the display, the user may release the shutter B or press the shutter T again to end the imaging, thereby ending the entire exposure process. After the imaging ends, the controlling module 110 may then store, in the image storing module 170, the image being displayed on the display. Thereby, the user may obtain a fairly good photo simply by one photographing operation.

In an embodiment, after the imaging ends, the controlling module 110 may control the displaying module 160 to tile the display with all images generated during the imaging, such that they are displayed. In this way, the user may compare, and choose from, the displayed images. In the end, the controlling module 110 may store, in the image storing module 170, one or more images on the display chosen by the user(s). In this way, during imaging, photos with exposure effects at different exposure times may be displayed in real time, and images with different exposure effects may be displayed at the same time.

Figure 4:
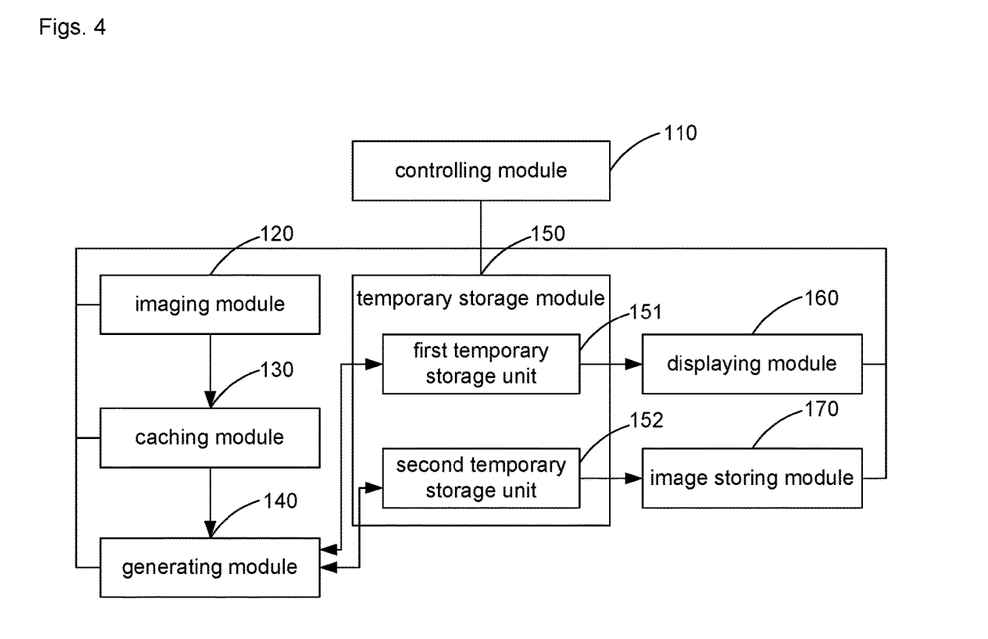
FIG. 4 is a diagram of modules of an imaging device according to a second embodiment herein.

Referring to FIG. 4, an imaging device according to a second embodiment herein may include a controlling module 110, an imaging module 120, a caching module 130, a generating module 140, a temporary storage module 150, a displaying module 160, and an image storing module 170.

The embodiment differs from the last embodiment in that the temporary storage module 150 may include a first temporary storage unit 151 and a second temporary storage unit 152. The generating module 140 may continuously generate preview-sized images and full-sized images respectively through two threads according to the collected image data; store the preview-sized images in the first temporary storage unit 151; and store the full-sized images in the second temporary storage unit 152. The controlling module 110 may output the preview-sized images in the first temporary storage unit 151 to the displaying module 160 to display the preview-sized images. After the imaging ends, the controlling module 110 may store, in the image storing module 170, an image last stored in the second temporary storage unit 152. In an embodiment, the controlling module 110 may copy an image chosen on the display by the user from the second temporary storage unit 152 to the image storing module 170.

A preview-sized image may refer to an image of a small number of pixels. A full-sized image may refer to an image of a large number of pixels required or set by the user, much larger than the number of pixels in a preview-sized image. An image of a large number of pixels is generated at a slow speed. With a generating module 140 of a slow computing speed, slow image generation will lead to intermittent image display in real time. The preview-sized images and the full-sized images may be generated respectively through two threads. The preview-sized images, each having a small number of pixels, may be generated faster, and thereby will be output and displayed on the display in real time more smoothly, avoiding intermittent display.

An imaging device herein may continuously collect image data during the entire imaging with a slow shutter speed, continuously generate images using the collected image data, and display the generated images on a display in real time, such that the user may preview the exposure effect. During the image data collection, a collecting speed is adjusted in real time according to space remaining in a caching module, making maximal use of processing capacity of an imaging device while avoiding data loss caused by an overly large collecting speed, improving a real-time nature in displaying the exposure effect, improving user experience. After the exposure ends, the user is allowed to choose multiple photos with different exposure effects from the display, such that the user may obtain, with one photographing operation, multiple photos with various effects, further improving user experience. What described are merely embodiments of the present disclosure and are not intended to limit the patentable scope of the present disclosure. Any equivalent structure or flow variant made using content of the present disclosure and the drawings, or direct or indirect application to another related technical field, likewise falls within the patentable scope of the present disclosure.

INDUSTRIAL APPLICABILITY

With an image processing method as provided herein, image data may be collected continuously during the entire imaging process, images may be generated continuously using the collected image data, and the generated images may be displayed on a display in real time, such that the user may preview the exposure effect. During the image data collection, a collecting speed is adjusted in real time according to space remaining in a caching module, making maximal use of processing capacity of an imaging device while avoiding data loss caused by an overly large collecting speed, improving a real-time nature in displaying the exposure effect, improving user experience. After the exposure ends, the user is allowed to choose multiple photos with different exposure effects from the display, such that the user may obtain, with one photographing operation, multiple photos with various effects, further improving user experience.

The invention claimed is:

1. An image processing method executed by an imaging device, comprising:
   continuously collecting image data, and adjusting a collecting speed according to storage space remaining in the imaging device;
   continuously generating images by synthesizing the image data presently collected and image data previously collected; and
   displaying the images on a display;
   wherein a synthesizing ratio for synthesizing a recently collected image is controlled according to exposure of the generated new image.

2. The method according to claim 1, wherein the adjusting a collecting speed according to storage space remaining in the imaging device comprises:
   determining whether the storage space remaining in the imaging device reaches a preset value;
   when the storage space remaining in the imaging device reaches the preset value, adjusting the collecting speed to a preset speed.

3. The method according to claim 1, wherein the continuously generating images by synthesizing the image data presently collected and image data previously collected comprises continuously generating preview-sized images and full-sized images respectively by synthesizing the image data presently collected and image data previously collected, and the displaying the images on a display comprises displaying the preview-sized images on the display.

4. The method according to claim 3, wherein the displaying the images on a display comprises:
   displaying the preview-sized images one by one on the display, overlaying a preview-sized image generated earlier with a preview-sized image generated later.

5. The method according to claim 3, further comprising: after the displaying the preview-sized images on the display,
   storing a full-sized image corresponding to a preview-sized image on the display chosen by a user.

6. The method according to claim 3, further comprising: after the displaying the preview-sized images on the display,
   storing a full-sized image corresponding to a preview-sized image being displayed on the display.

7. The method according to claim 1, further comprising: after the displaying the images on a display,
   storing an image on the display chosen by a user.

8. The method according to claim 1, further comprising: after the displaying the images on a display,
   storing an image being displayed on the display.

9. An imaging device, comprising an imaging element, a cache, a processor, a temporary storage, and a display, wherein
   the imaging element is configured for continuously collecting image data;
   the cache is configured for caching the image data collected by the imaging element;
   the processor is configured for continuously generating images by synthesizing the image data presently collected and image date previously collected by the imaging element, and for integrated control of operation of the imaging element, the cache, the processor, the temporary storage and the display;
   the temporary storage is configured for temporarily storing the continuously generated images;
   the display is configured for displaying the images, wherein the imaging element adjusts a collecting speed according to storage space remaining in the cache,
   wherein a synthesizing ratio for synthesizing a recently collected image by the processor is controlled according to exposure of the generated new image.

10. The device according to claim 9, wherein the imaging element is further configured for:
    determining whether the space remaining in the cache reaches a preset value;
    when the space remaining in the cache reaches the preset value, adjusting the collecting speed to a preset speed.

11. The device according to claim 9, wherein the temporary storage comprises a first temporary storage unit and a second temporary storage unit;
    the processor is configured for: continuously generating preview-sized images and full-sized images respectively by synthesizing the image data presently collected and image data previously collected by the imaging element;
    the first temporary storage unit is configured for storing the preview-sized images;
    the second temporary storage unit is configured for storing the full-sized images; and
    the display is configured for displaying the preview-sized images in the first temporary storage unit.

12. The device according to claim 11, wherein the display is configured for displaying the preview-sized images one by one, overlaying a preview-sized image generated earlier with a preview-sized image generated later.

13. The device according to claim 11, further comprising an image storage, wherein the display is further configured for displaying all generated preview-sized images; the image storage is further configured for storing a full-sized image corresponding to a preview-sized image on the display chosen by a user.

14. The device according to claim 11, further comprising an image storage, wherein the image storage is further configured for storing a full-sized image corresponding to a preview-sized image being displayed on the display.

15. The device according to claim 9, further comprising an image storage, wherein the display is further configured for displaying all generated images; the image storage is further configured for storing an image on the display chosen by a user.

16. The device according to claim 9, further comprising an image storage, wherein the image storage, is further configured for storing an image being displayed on the display.

\* \* \* \* \*